F. G. HENRY.
CLUTCH.
APPLICATION FILED OCT. 11, 1915.
1,268,350.
Patented June 4, 1918.
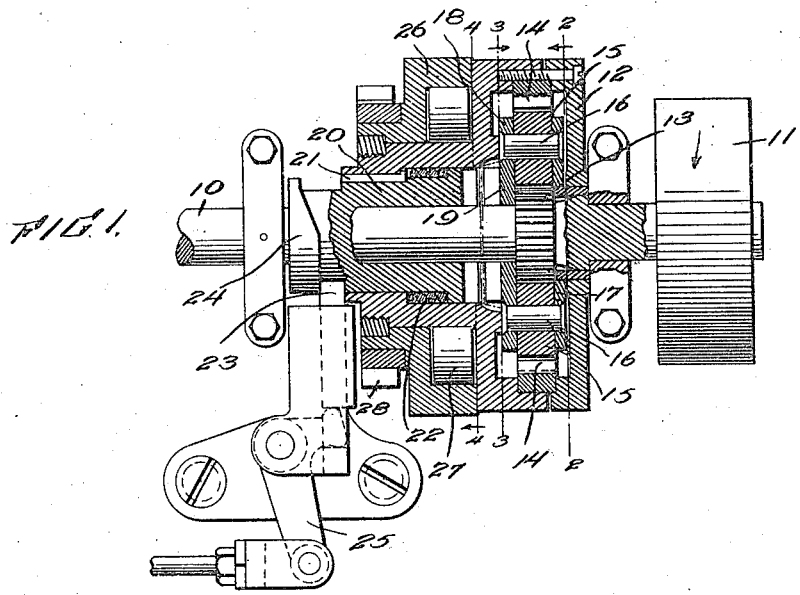
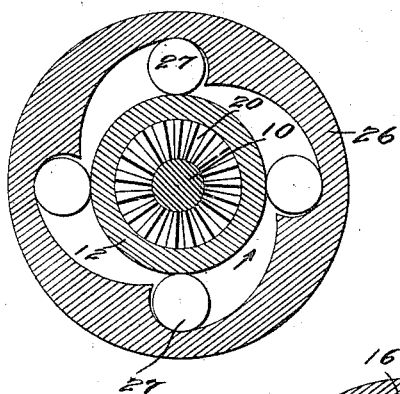
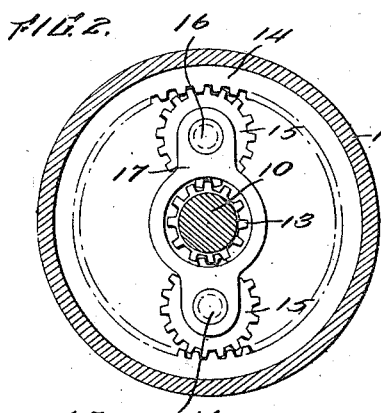
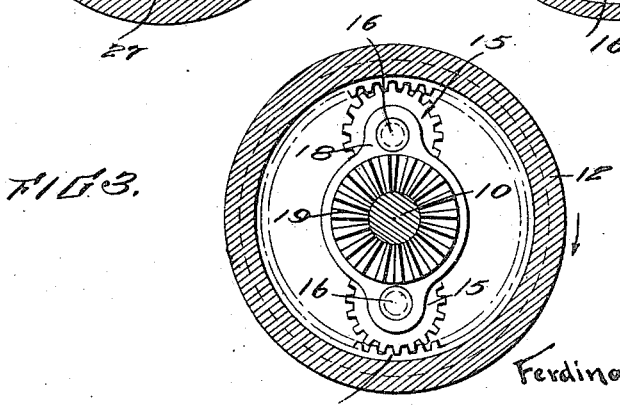
Inventor
Ferdinand G. Henry,
Witnesses

UNITED STATES PATENT OFFICE.

FERDINAND G. HENRY, OF PHILADELPHIA, PENNSYLVANIA, ASSIGNOR TO BURKHART CORPORATION, OF BUFFALO, NEW YORK, A CORPORATION OF NEW YORK.

CLUTCH.

1,268,350.   Specification of Letters Patent.   Patented June 4, 1918.

Application filed October 11, 1915.   Serial No. 55,278.

*To all whom it may concern:*

Be it known that I, FERDINAND G. HENRY, a citizen of the United States, residing at Philadelphia, in the county of Philadelphia and State of Pennsylvania, have invented certain new and useful Improvements in Clutches; and I do hereby declare the following to be a full, clear, and exact description of the invention, such as will enable others skilled in the art to which it appertains to make and use the same.

This invention relates to clutches and has for an object to provide a clutch for use in connection with a rapidly rotating shaft with means for picking up another shaft at a speed less than the speed of rotation of the shaft.

It is well known that it is dangerous to the mechanism to pick up with a clutch from a rapidly rotating member. The present invention, therefore, embodies means for picking up the motion at a speed very much less than the speed of rotation of the shaft and immediately converting such speed into the maximum speed of the shaft.

In the drawings:

Figure 1 is a sectional view of the improved clutch.

Fig. 2 is a transverse sectional view taken on line 2—2 of Fig. 1.

Fig. 3 is a transverse sectional view taken on line 3—3 of Fig. 1.

Fig. 4 is a transverse sectional view taken on line 4—4 of Fig. 1.

Like characters of reference designate corresponding parts throughout the several views.

The improved structure which forms the subject-matter of this application is adapted to operate in conjunction with a shaft 10 rapidly driven in any approved manner as by the pulley 11.

Within the clutch housing 12 the shaft 10 is provided with a gear 13 which, of course, rotates simultaneously therewith. The housing 12 is also provided with an internal gear 14 with idlers 15 rotating between the gear 13 and the internal gear 14, such idlers having planetary rotation upon trunnions 16, carried by spiders 17 and 18 free to rotate within the housing 12 about the shaft 10. The relation of the gears is immaterial to the present invention but as shown in the drawing especially at Figs. 2 and 3 it will be obvious that the spiders 17 and 18 will rotate about once to five revolutions of the shaft 10. The spider 18 carries a clutch face 19 and a clutch member 20 is mounted freely upon the shaft 10 and to slide longitudinally relative to the housing 12 by means of a splined connection 21. A spring 22 is adapted to throw the clutch member 20 into engagement with the clutch face 19 when the clutch member is permitted to move. The clutch member 20 is held normally out of engagement with the clutch face 19 by means of a bolt 23 engaging a cam collar 24. The bolt 23 is operated manually or mechanically by any approved means as the lever 25 and when released permits the clutch member 20 to move slidably into engagement with the clutch face 19. As the clutch member 20 is held against rotation relative to the housing 12 it is obvious that when such clutch member engages the clutch face 19 it will pick up the motion of the spider 18 and rotate the housing 12 initially at such speed. It will thus be obvious that the housing 12 is picked up at a speed much less than the rotation of the shaft 10, that is to say as the parts are proportioned in the drawing about one to five. About one part of the housing 12 a casing 26 is located with roller clutches 27 of substantially the usual and ordinary type so that as the housing 12 is rotated it also picks up the casing 26 which carries means for transmitting the power as the gear 28. As the housing rotates the bolt 23 is let back into position to engage the collar 24 when it is desired to disengage the clutch and by engagement against the cam by its own motion and power forces the clutch member 20 out of engaging position as shown at Fig. 1.

As an example let it be supposed that the shaft 10 is rotating at five hundred revolutions. The cam face 19 of the spider 18 is, therefore, rotating at one hundred revolutions. The clutch member 20, therefore, engages not at five hundred revolutions but at one hundred revolutions. Immediately after the engagement of the clutch member 20 with the clutch face 19 the housing 12 is rigidly locked with the shaft 10 and jumps to five hundred revolutions. Another clutch, however, is interposed between the housing 12 and the power transmission so that this jump from one hundred to five hundred revolutions is eased by the action of the second clutch.

Upon rapidly rotating parts it has heretofore been found necessary to employ friction clutches instead of positive clutches as it was found impossible to pick up from the rapid motion of the rapidly rotating part. By picking up at a low speed, however, and immediately by reason of the connection jumping to the maximum speed and then introducing a second clutch to ease the jerk incident upon picking up the high rate of speed it is found that a positive clutch can be employed upon rapidly rotating parts without fear of breakage or stripping of the parts.

I claim:

1. The combination of a rapidly rotating part embodying a gear, an internal gear normally stationary, a planetary gear revolving about such first mentioned gear at a slower rate of speed and intergeared with the internal gear, a member journaling the planetary gears and carrying a clutch face and a clutch member adapted to engage the clutch face of the gear journaling member and lock all into a unitary structure.

2. The combination of a rapidly rotating shaft and a gear thereon, a housing surrounding the shaft and gear and embodying an internal gear, planetary gears revolving between the first mentioned gear and the internal gear, spiders rotating about the shaft and journaling the planetary gears and carrying a clutch face, a clutch member held against rotation relative to the housing and adapted to inter-engage with the clutch face of the spiders and means to take power from the housing.

3. The combination with a rapidly rotating shaft and a gear thereon, of a housing surrounding the gear and embodying an internal gear, spiders mounted to rotate upon the shaft and relative to the housing and carrying a clutch face, planetary gears carried by the spiders and interposed between the gear of the shaft and the internal gear, a clutch member held against rotation relative to the housing and adapted to engage the clutch face carried by the spiders and means to take power from the housing.

4. The combination with a rapidly rotating shaft and a gear thereon, of a housing surrounding the gear and provided with an internal gear in plane with the gear of the shaft, a spider surrounding the shaft and free to rotate relative thereto and to the housing and carrying a clutch face, planetary gears journaled upon the spider and inter-geared with and free to rotate between the gear of the shaft and the internal gear, a clutch member slidable relative to the housing but held against rotation relative thereto and adapted to engage the clutch face of the spider, a roller clutch member adapted to take motion from the housing and means to take power from the roller clutch member.

In testimony whereof I affix my signature in presence of two witnesses.

FERDINAND G. HENRY.

Witnesses:
CHAS. F. BURKHART,
MARY A. McLAUGHLIN.

Copies of this patent may be obtained for five cents each, by addressing the "Commissioner of Patents, Washington, D. C."